Jan. 14, 1964   A. F. BEHNKE   3,117,799
SELF EQUALIZING TANDEM SPRING SUSPENSION ASSEMBLY
Filed Nov. 14, 1961
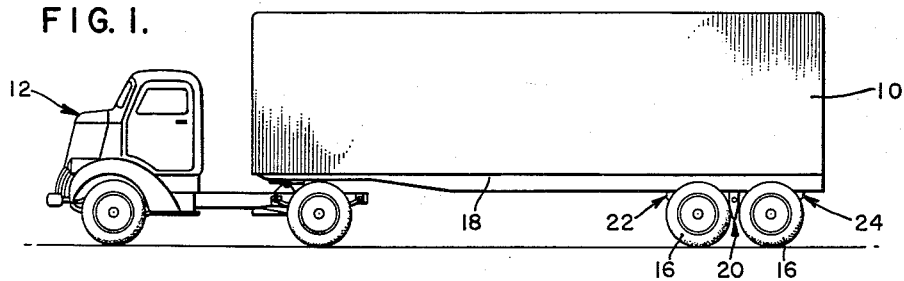
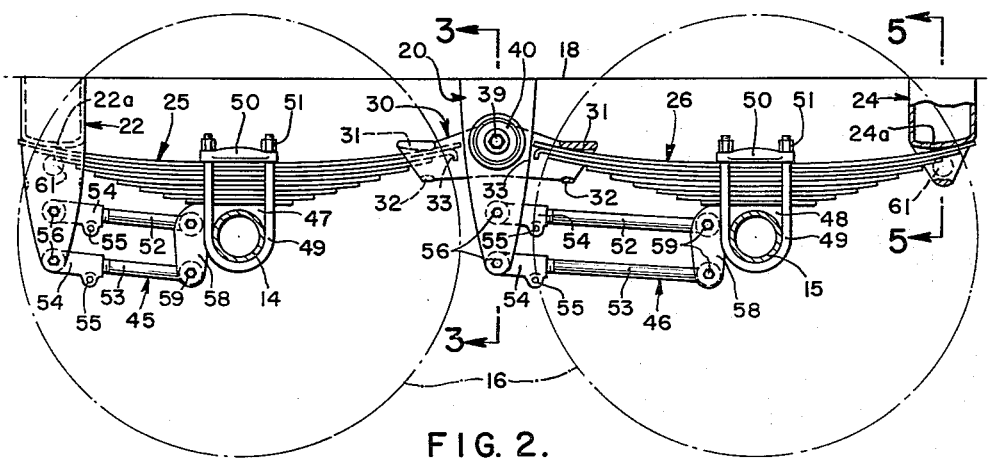
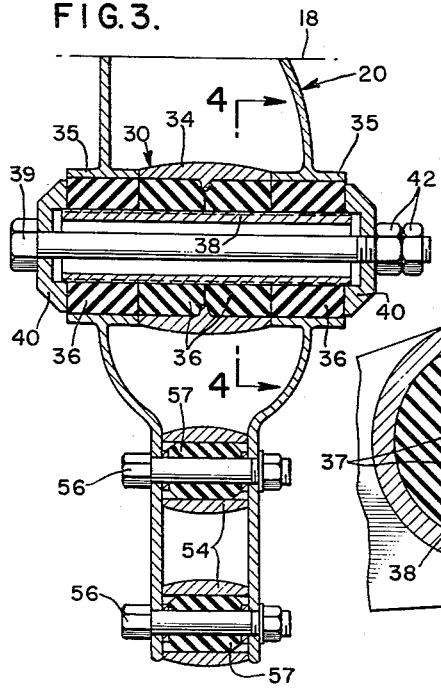
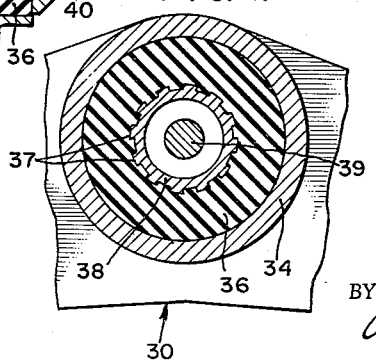
INVENTOR.
ARNOLD F. BEHNKE
BY
ATTORNEY.

United States Patent Office 3,117,799
Patented Jan. 14, 1964

3,117,799
SELF EQUALIZING TANDEM SPRING
SUSPENSION ASSEMBLY
Arnold F. Behnke, Rosemead, Calif., assignor to Kay-Brunner Steel Products, Inc., Alhambra, Calif., a corporation of California
Filed Nov. 14, 1961, Ser. No. 152,278
9 Claims. (Cl. 280—104.5)

This invention relates to spring suspension assemblies and more particularly to an improved self-equalizing tandem spring assembly for use upon trailers, trucks, vans and the like vehicles and featuring rugged, positively acting means for preventing brake hopping despite the full floating connection provided between the load and the spring suspension assembly per se.

Brake hopping has long been a serious problem in tandem spring suspension assemblies because of the pronounced tendency of the front pair of wheels in particular to hop as the brakes are applied, thereby greatly reducing contact with the road bed so vital to effective and proper braking of the vehicle. As is well known, hopping of the forward axial assembly introduces serious and severe abnormal loads on the assembly thereby necessitating frequent inspection and servicing and causing premature damage and if not breakage of components. These problems and shortcomings of tandem spring suspension assemblies are well known to persons experienced in this art and to those using vehicles equipped with the numerous designs heretofore proposed in efforts to solve the problems.

One of the prior proposals found more effective than others involves the use of a single radius rod pivotally connected at its forward end to the forward spring hanger and at its rear end to an arm extending downwardly below the wheel axle. This arrangement tends to minimize brake hopping but only to a limited extent because of the tendency of a floating spring and axle assembly to torque about a pivot point provided by the pivotal connection between the bracket carried by the spring seat and the rear end of the radius rods as the brakes are applied. This torquing of the forward wheel of the tandem suspension acts to unload the front wheel and spring assembly and to transfer this load to the rear wheel with the result that the front wheel leaves the road or "hops."

The present invention has been found highly successful in practice in eliminating brake hopping and in completely avoiding shortcomings and disadvantages of prior construction. These objectives are achieved while retaining the many advantages of a full floating spring suspension of the equalizing beam type in combination with tandem axle units. In brief, the improvements of this invention are achieved by interposing a parallelogram linkage of resiliently interconnected components between each spring seat and the associated forward hanger. This linkage provides positive and absolute control over wheel torque while permitting the axle and suspension assembly to move vertically relative to the load as well as to have a floating connection with load supporting frame. By reason of this arrangement the dual axle and the rigidly connected spring leaf assemblies are free to float beneath the vehicle frame without need for rigid or semi-rigid connections between the free ends of the spring and the hanger members or the equalizing beams; yet unloading of either spring or torquing of either pair of wheels is positively safeguarded against with the result that it is impossible for brake hopping to occur during application of the brakes. Instead, all wheels remain equally loaded and in firm contact with the road for maximum efficiency and effectiveness of braking, traction, shoe loading, etc.

Accordingly, and with the foregoing shortcomings of the prior art in mind, it is a primary object of the present invention to provide an improved spring suspension assembly of the tandem-connected type employing a novel arrangement of a parallelogram linkage between the opposite ends of each axle and the vehicle frame.

Another object of the invention is to provide an improved tandem spring suspension assembly positively effective to eliminate brake hopping.

Another object of the invention is the provision of a tandem spring suspension system utilizing a pivoting equalizer beam between the adjacent ends of the spring leaf assemblies and featuring a brake hop-control linkage of novel design and action.

Another object of the invention is the provision of an equalized spring suspension assembly for tandem-connected wheels wherein the opposite ends of each axle unit is connected to the frame through a parallelogram linkage effective to restrict axial movement within a substantially vertical plane while positively preventing torquing of the axle and of the attached spring during brake application.

These and other more specific objects will appear upon reading the following specification and claims and upon consideration in connection therewith the attached drawings to which they relate.

Referring now to the drawings in which a preferred embodiment of the invention is illustrated.

FIGURE 1 is a side elevational view illustrating a tractor pulling a semi-trailer supported at its rear by a tandem spring suspension assembly incorporating the features of this invention;

FIGURE 2 is a side elevational view on an enlarged scale of the suspension assembly;

FIGURE 3 is a transverse vertical sectional view taken on line 3—3 of FIGURE 2;

FIGURE 4 is an enlarged sectional view taken on line 4—4 of FIGURE 3; and

FIGURE 5 is another sectional view taken on line 5—5 of FIGURE 2.

Referring to FIGURE 1, there is shown a typical semi-trailer van 10 coupled to the fifth wheel of a conventional tractor vehicle 12, the rear end of the trailer being supported on a tandem spring suspension assembly incorporating features of this invention. This suspension assembly includes a front axle 14 and a rear axle 15 each supported at their ends by conventional brake-equipped wheels 16.

As is best shown in FIGURE 2, the load is transferred to the axles and wheels through identical components of the suspension system located along either side of the trailer. In the interest of simplicity only those components on one side are therefore illustrated and described. These identical components include a middle hanger 20, a forward hanger 22 and a rear hanger 24, each rigidly secured to and depending from trailer frame 18. The load is transmitted to axles 14 and 15 by forward and rearward spring beams 25 and 26 by way of the described hangers and a pivoting equalizer beam 30 pivotally supported in middle hanger 20.

The equalizer beam assembly is best shown in FIGURES 2 and 3 and comprises a hollow cast steel beam 30 provided at each end with generally convex surfaced bearing pads 31, 31 resting slidingly against the upper adjacent ends of spring beams 25, 26. Safety keepers 32, 32 extend across the lower opposite ends of beam 30 and are engageable under extreme operating conditions with the downwardly hooked ends 33, 33 of beams 25, 26 to safeguard against the possibility of disassembly of the spring beams from equalizer 30. Each end of the equalizer beam 30 may be described as a tubular member adapted to receive loosely the respective adjacent ends of the spring beams. The opposite or remote ends of the spring beams are similarly received between the downwardly extending legs of hangers 22, 24 and rest against the convex bearing surfaces 22a, 24a, respectively, of these one-piece cast steel hangers.

An important feature of equalizer beam 30 concerns the provision made for pivotally supporting this beam under adjustable resilient restraint between the downwardly extending legs or side walls of the inverted U-shaped hanger 20. As is best shown in FIGURES 3 and 4, the central portion of beam 30 is provided with a transverse cylindrical housing 34 the opposite ends of which are in alignment with and juxtaposed to the ends of similar cylindrical bosses 35, 35 formed in the side walls of center hanger 20. Four identical specially compounded tough rubber bushings 36 have smooth exterior cylindrical surfaces seating with a press fit against the identical interior surfaces of housing 34 and bosses 35. The central axial bores of the ring-like rubber bushings 36 are serrated axially and have a press fit over the complemental splined exterior surface of the torsion tube 38. Torsion tube 38 has a combined length greater than the thickness of all four bushings and projects slightly from the opposite end faces of the two outer pair of these bushings. It is also pointed out that the combined thickness of all four bushings is preferably as great or somewhat greater than the axial distance between the remote faces of bosses 35, 35 for reasons which will become apparent presently.

From the foregoing it will be understood that each of the described bushings is positively interlocked with torsion tube 38 by reason of splines 37. Likewise, it is pointed out that the smooth peripheral surfaces of the bushings are adapted to be expanded into strong frictional engagement with the smooth internal bores of housing 34 and bosses 35 but that relative rotary movement between these contacting surfaces normally does not but can occur under extreme operating conditions to be referred to more fully below.

To adjust the restraining capability of the described pivotal connection between hanger 20 and beam 30 there is provided a through bolt 39 and a pair of identical cup-shaped pressure pads 40, 40. The facing flat surfaces of these pressure pads bear directly against the adjacent and exposed faces of the outer pair of bushings 36, 36. A pair of nuts 42 on the threaded right-hand end of bolt 39 can be adjusted to force the pressure plates 40, 40 toward one another thereby to place all bushings under the desired axial compression to give the assembly any desired degree of resilient pivotal restraining capacity. In this connection it is pointed out that all rings are thereby expanded under high radial pressure against the inner surfaces of housing 34 and bosses 35. Additionally, the abutting faces between each outer pair of bushings 36 are pressed together to augment the pivotal restraining movement as well as to transmit high compression forces from the outer pair of bushings to the inner pair carried by housing 34 of the equalizing beam. Once the correct adjustment for a particular set of operating conditions is achieved, the two nuts 42 are clamped against one another to lock the parts in adjusted position.

Referring now to FIGURES 2 and 3, there will be described the very important mechanism functioning to hold the tandem axles 14 and 15 accurately positioned parallel to one another while permitting each axle and the attached spring beam to move through a limited vertical path without permitting brake hopping and while holding the opposite ends of the spring beams floatingly in place beneath the vehicle load. The mechanisms referred to are designated generally 45 and 46. Essentially each comprises a parallelogram linkage having one end connected to an associated axle and its opposite end connected to a forwardly positioned hanger bracket. Before describing the linkages themselves, it is pointed out that each spring beam 25, 26 is rigidly connected at its midportion to an associated carriage axle by a combined spring seat and bracket 47, 48. As shown herein, seats 47 and 48 are secured to their respective axles by pairs of U-bolts 49 and clips 50 clamped across the spring beams by the upper ends of the U-bolts by nuts 51.

Each of the linkages 45, 46 is substantially identical except that forward linkage 45 is somewhat shorter than the rear linkage 46 because rear axle 15 is spaced farther from hanger 20 than axle 14 is from forward hanger 22 to accommodate equalizer beam 30. Accordingly, a description of one parallelogram linkage will suffice for both.

Linkage 45 comprises a pair of high-strength radius rods 52, 53 preferably having a threaded end adjustably clamped in a fitting 54 as by set screw 55. The cylindrical ends of coupling members 54 are held assembled between the parallel legs of hangers 20, 22 by through bolts 56, 56. In this connection it is pointed out that a rubber bushing 57 is interposed between the shank of each bolt and the internal bore of the cylindrical ends of members 54, the arrangement being such that each radius rod 52, 53 is resistingly held against pivoting in a vertical plane but has only very restricted lateral movement laterally of the vehicle frame. Desirably, radius rods 52, 53 are substantially restrained against transverse pivotal movement. Desirably, this coupling is of the type shown in my Patent 2,919,105 granted January 7, 1958.

Although not illustrated in detail it will be understood that the opposite ends of radius rods 52, 53 are provided with resilient bushing equipped fittings and similarly held assembled to the downturned bracket 58 of spring seat 47 by through bolts 59.

Referring now to FIGURES 2 and 5, it is pointed out that forward and rearward hangers 22, 24 are each preferably provided with a transverse stabilizer in the form of a rigid spacer tube 61. The opposite ends of stabilizer tubes 61 are socketed in wells 62 formed in the interior lower faces of brackets 22 and 24, as is made clear by FIGURE 5.

In operation of the described tandem suspension assembly, it will be understood that the position of the various components is that shown in FIGURE 2. In this connection it is to be noted in particular that the axes of the upper radius rods 52 lie slightly above a horizontal plane passing through the axes of carriage axles 14 and 15, respectively. Likewise, the axes of radius rods 53 are parallel to those of rods 52 but are spaced vertically below these rods and appreciably below the axes of axles 14, 15. Both of these spacings play important roles in the operation of described linkages, as will become apparent from the following description of the action during operation of the vehicle.

Let it be assumed that the vehicle is traveling down the roadway under normal conditions and that the usual bumps and irregularities in the roadway are encountered in succession by the forward and rear carriage wheels. As such irregularities are negotiated, it will be clear that each wheel effected is free to rise or fall depending upon the nature of the irregularity, the high strength parallelogram linkages 45 and 46 permitting the respective axle ends to rise and fall while holding the axles strictly in a vertical plane and without permitting rotary movement of the axle or the rigidly attached spring beam about the axis of the axle. Because of this positive restraining action, obstacles cannot cause either carriage axle to get out of parallelism with the other. And this is true despite the lack of a mechanical conection between the ends of the spring beams and the bearing pads on which each seats.

Let it now be assumed that the driver applies the brakes with which each wheel 16 of the tandem assembly is equipped in the usual manner. As the brakes are applied to stop the vehicle, the normally stationary part of the brake has a powerful tendency to rotate with the wheel being braked thereby tending to cause the carriage axles as well as the rigidly attached spring beams 25 and 26 to rotate counterclockwise, as viewed in FIGURES 1 and 2. This counterclockwise torque, if permitted to act, tends to unload the forward one of the carriages and to transfer a disproportionate part of the load onto the rear carriage wheel. This occurrence in prior tandem systems produces serious adverse effects. Not only does the decrease in load on the forward carriage result in decreased braking capacity between the shoe surface and the pavement, but it results in brake hopping and severe vibration and shuddering throughout the entire tandem suspension assembly.

These and related undesirable consequences are avoided by the described linkages 45, 46 which positively prevent torquing of the wheels in both carriages. All tendencies to torque are absorbed by the upper and lower radius rods 52, 53, the upper rod 52 being placed in compression and the lower rod in tension. As a result, the load is maintained evenly distributed between the opposite ends of both spring beams. Therefore, the braking effect of all wheels is equalized and maintained at a maximum value.

Also of importance is the fact that elevation of one axle end relative to the corresponding end of the adjacent axle is effective through equalizer beam 30 to transfer a portion of the load to the other spring beam by pivotal movement of the beam through a small arc about the axis of the resilient restraining pivot for this beam. In this connection, reverse torque loading of adjacent rubber bushings 36 occurs and is absorbed by deflection of the bushings or, under extreme conditions, by relative slippage between the peripheries of these bushings and the juxtaposed interior surfaces of bosses 35 and housing 34. As soon as the condition causing pivoting is removed, the spring beams and the natural restoring actions of the stressed rubber bushings act to return the equalizing beam to its normal horizontal position. Even where slippage has occurred between the bushings and the supporting housings therefor, the restoration of normal roadway conditions together with the normal action of the spring beams are cooperatively effective to restore the rubber bushings of beam 30 to their normal positions with beam 30 re-oriented to its proper normal position.

It should also be pointed out that the disposition of radius rods 52, 53 above and below the axis of the associated axle provides a very strong arrangement for holding each end of the carriage axle rigidly against displacement longitudinally of the trailer frame under all operating conditions. Furthermore, this described arrangement is equally effective in arresting braking torque as well as in holding the spring beams horizontal at all times with both ends of the beams bearing the applied load as equitably as possible and without need for positive mechanical connections between the beam ends and the frame; on the contrary, there is a truly floating connection between the load and the beam ends.

While the particular self equalizing tandem spring suspension assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a self-equalizing tandem suspension assembly for trucks, vans and the like, and of the type having a pair of brake-equipped carriages floatingly connected to the overlying vehicle frame by pairs of spring beams which spring beams are rigidly connected at their midportions to said carriages, the remote ends of the spring beams along each side of the frame bearing against hanger brackets rigid with the frame and the adjacent ends of the beams being interconnected by bearing contact with a pivotally supported equalizing beam carried by said frame through resilient torsion coupling means; that improvement in said assembly for controlling brake hopping which comprises, means including a separate pivotally connected parallelogram linkage between the opposite ends of each carriage and the vehicle frame on each side of the vehicle, each of said linkages including an upper and a lower link lying generally parallel to one another in the same vertical plane with the associated spring beam and vehicle frame and being operable to permit limited vertical movement of the respective carriages relative to the vehicle frame while mutually sharing braking torque forces and mutually preventing torquing of the spring beams and of said carriages during braking of said carriages thereby to prevent unloading of any spring beam and the hopping of either carriage as the result of such unloading.

2. A tandem suspension assembly as defined in claim 1 characterized in that said parallelogram linkages, each include an inverted L-shaped bracket at one end thereof having its horizontal leg sandwiched between the underside of a spring beam and the carriage axle and its vertical leg projecting downwardly below the axle along one lateral side thereof, and means connecting the opposite end of both rods of each linkage to the vehicle frame through said hanger brackets in a zone underlying one end of the associated spring beam.

3. In a tandem spring suspension assembly of the type having a pair of brake-equipped carriage axles each provided at its opposite ends with rigidly attached spring beams arranged to support a vehicle frame through floating connections including hangers and a pivoting equalizing beam positioned between the adjacent beam ends along either side of the vehicle frame; that improvement for preventing brake hopping upon application of the carriage brakes which comprises for each of said axles, bracket means rigidly connected to the midportion of each spring beam and rigidly connected to and projecting downwardly along one side of the adjacent end of the associated carriage axle, a plurality of pairs of elongated radius rods with the rods of each pair lying in generally parallel relation in a vertical plane passing longitudinally through the adjacent spring beam, resilient means movably connecting the rear ends of each pair of said radius rods to an associated one of said brackets, resilient means movably connecting the forward ends of each pair of said rods to the one of said hangers located forwardly of the carriage axle, said radius rods cooperating to share the draft load forces acting on the carriage and to permit limited vertical movement of said carriage relative to the vehicle frame at all times and being operable to prevent torquing of the carriage during application of the carriage brakes with the result that the carriage wheels remain in firm braking contact with the roadway and fully effective in supporting an equitable share of the vehicle load.

4. A tandem spring suspension as defined in claim 3 characterized in that the rods of each pair of said radius rods lie in planes spaced on the opposite sides of a horizontal plane through the axis of said carriage axle.

5. A tandem spring suspension assembly as defined in claim 3 characterized in that the upper one of each pair of said radius rods lies in a plane above the axis of the associated carriage axle and the lower one of each pair of radius rods lies in a plane spaced below the associated carriage axle whereby said lower rods are placed in tension and said upper rods are placed in compression when resisting braking torque of said carriage wheels, and both said upper and lower rods acting in tension and normally cooperating in towing the carriage axles when the vehicle is being pulled forwardly.

6. A tandem spring suspension as defined in claim 3 characterized in that said equalizing beam between the adjacent ends of said spring beams includes torque-resisting pivot means connecting the midportion of said equalizing beam to the vehicle frame, said pivot means being normally effective to hold said equalizing beam generally horizontal but permitting the latter beam to pivot in either direction in opposition to its torque-resisting properties as the adjacent carriage wheels move relative to one another in rolling over uneven ground, rough spots, and the like, and the upper one of each pair of radius rods being disposed close to a horizontal plane through the carriage axles and the lower one of each pair being disposed on a level below the carriage axle.

7. A tandem spring suspension as defined in claim 6 characterized in the provision of means adjustable to vary the torque-resisting characteristics of the pivoting support for said equalizing beam and for locking the same in a desired adjusted position.

8. In a tandem spring suspension assembly of the type having a pair of brake-equipped carriages each provided at its opposite ends with a spring beam extending generally horizontally and each having its midportion rigidly connected to an associated carriage axle, a vehicle frame overlying said spring beams and arranged to be supported from the opposite ends of said beams through floating connections comprising rigid hangers secured to said frame adjacent both ends of all spring beams, the remotely located hangers on each side of said frame having sliding load-bearing contact with an end of the adjacent spring beam, equalizing beam means pivotally mounted on the center one of said hangers and having sliding load-bearing contact between its opposite ends and the adjacent ends of said spring beams, and generally identical and separate parallelogram linkage assemblies rigidly connected one to each outer end of said carriage axle below and in the plane of a spring beam and with its forward end flexibly connected to one of said hangers, said separate parallelogram linkage assemblies cooperating to hold said carriage axles movably connected to said vehicle frame with each axle end free to move in a limited vertical path toward and away from said frame while holding the axle rigidly against rotational torque movement as the carriage brakes are applied thereby to minimize tendencies for unequal load distribution between the two carriages and brake hopping of the forward carriage, and both the draft load forces and the braking torque forces being distributed between and shared by the components of said parallelogram linkage assemblies.

9. A tandem spring suspension as defined in claim 8 characterized in that said hangers include a plurality of hangers of inverted U-shape, the bight portion of said hangers having a convex surface between its legs providing a load-bearing surface and slidingly seating an adjacent end of a spring beam, and said parallelogram linkage assemblies each including a pair of radius rods having means connecting one set of ends to an end of an associated axle and its other set of ends to the legs of said hanger, and the radius rods of each of said linkage assemblies lying generally parallel to the ground with one thereof closely above and the other below a horizontal plane passing through the carriage axle.

References Cited in the file of this patent
UNITED STATES PATENTS

| | | |
|---|---|---|
| 1,946,060 | Buckendale | Feb. 6, 1934 |
| 2,620,226 | Jones | Dec. 2, 1952 |
| 2,639,166 | Jones | May 19, 1953 |
| 2,653,035 | Ward | Sept. 22, 1953 |
| 2,741,491 | Van Raden | Apr. 10, 1956 |
| 3,022,087 | Black | Feb. 20, 1962 |

OTHER REFERENCES

Reynolds Mfg. Co., Commercial Car Journal, October 1957, page 63.